United States Patent [19]

Ikawa et al.

[11] 4,097,064
[45] Jun. 27, 1978

[54] AIR-CUSHION DEVICE WITH A COVER AND A COVER CUTTER

[75] Inventors: Kazuo Ikawa; Hideoki Matsuoka, both of Yokohama, Japan

[73] Assignee: Nissan Motor Company, Limited, Yokohama, Japan

[21] Appl. No.: 727,613

[22] Filed: Sep. 28, 1976

[30] Foreign Application Priority Data

Sep. 30, 1975 Japan ................................ 50/117883

[51] Int. Cl.² ............................................ B60R 21/10
[52] U.S. Cl. ..................................... 280/732; 180/90; 280/752
[58] Field of Search .................. 180/90; 280/728, 732, 280/743, 752, 753

[56] References Cited

U.S. PATENT DOCUMENTS

| 3,756,617 | 9/1973 | Brawn | 180/90 X |
| 3,794,349 | 2/1974 | Fuller | 180/90 X |
| 3,930,664 | 1/1976 | Parr | 280/732 |

FOREIGN PATENT DOCUMENTS

| 2,643,451 | 4/1977 | Germany | 280/732 |

Primary Examiner—Joseph F. Peters, Jr.
Assistant Examiner—Terrance L. Siemens
Attorney, Agent, or Firm—Bacon & Thomas

[57] ABSTRACT

A cover for an air-cushion is cut open by a cutter with the assistance of the expanding air-cushion to allow the air-cushion to quickly expand to its designed size in case of vehicle collision.

7 Claims, 3 Drawing Figures

AIR-CUSHION DEVICE WITH A COVER AND A COVER CUTTER

The present invention relates in general to a safety device for protecting an occupant of a vehicle during an accident and more particularly to an air-cushion device which operates to restrain forward movement of the occupant during a vehicle collision for protecting the occupant from injury.

It is an object of the present invention to provide an improved air-cushion device which assuredly operates to protect a vehicle occupant in a collision of the vehicle.

It is another object of the present invention to provide an air-cushion device having an expansible air-cushion into which a gas generated by a gas generator is fed for expanding the air-cushion to protect an occupant of a vehicle during an accident, the air-cushion device comprising: cover means for substantially covering the air-cushion in a collapsed condition; and cutting means for cutting the cover means with the assistance of the expansion of the air-cushion so that the cover means is broken to allow the air-cushion to quickly escape from the cover means to fully expand.

Other objects and advantages of the present invention will become apparent from the following description when taken in conjunction with the accompanied drawings, in which.

Prior to describing the construction of the air-cushion device of the invention, description of the conventional air-cushion device will be made in order to clarify the inventive steps of the invention.

Figure 1:
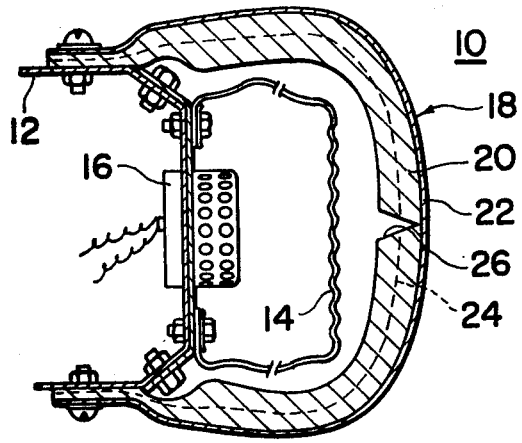
FIG. 1 is a sectional view of a conventional air-cushion device in a collapsed condition.

In FIG. 1, there is shown a conventional air-cushion device 10 which is mounted on a base member 12 positioned at a front portion of a vehicle passenger compartment (not shown). The air-cushion device 10 includes an expansible air-cushion 14 which is sealingly fixed to the base member 12. The air-cushion 14 can be expanded from a collapsed condition, illustrated in this drawing, to an expanded condition, A gas generator 16 is mounted on the base member 12 to protrude into the air-cushion 14 as shown, so that an expanding gas generated by the generator 16 will fill the air-cushion 14 in case of collision. Covering the air-cushion 14 in a collapsed condition is dome-shaped cover means 18 which is fixed at its open end to the base member 12 and comprises a padding 20 covered with skin material 22 such as polyvinyl chloride film. Within the padding 20 is disposed a reinforcement 24, such as steel plate, plastic plate or wire mesh, which increases the mechanical strength of the cushion cover means 18. The padding 20 is formed with an elongate cut 26 at its inside portion. Thus, when the air-cushion 14 is expanded and pushes outwardly the inner surfaces of the padding 20, the padding 20 is divided along the cut 26 into two segments thus allowing the air-cushion 14 to get out from the cushion cover means 18 for full expansion of the air-cushion 14.

The above-mentioned conventional air-cushion device, however, has the following drawbacks:

(1) The provision of the cut 26 in the padding 20 will cause decrease in mechanical strength of the cover means 18.

(2) In mass-production process of the padding 20 covered with the skin material 22, it is very difficult to make the size of the cut 26 uniform throughout the whole production.

(3) When the cut 26 in the padding 20 covered with the skin material 22 is made by using a so called high-frequency cutter, some strong shrinkages are caused to appear on the skin material 22 at a portion facing the cut, thus lowering the styling appearance of the air-cushion device.

(4) When such cushion cover means is produced of foam material, such as urethan foam and polyvinyl chloride foam, by means of monoblock injection moulding, some specially designed moulding machines are inevitably required thus increasing the production cost of the cushion cover means.

Therefore, as previously mentioned, the present invention is proposed to eliminate the drawbacks encountered in the conventional air-cushion device.

Figure 2:
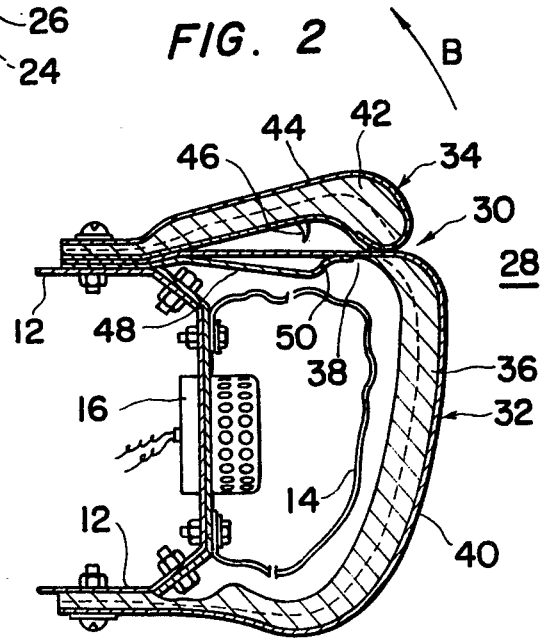
FIG. 2 is a sectional view of a first preferred embodiment of an air-cushion device according to the present invention.

Referring to FIG. 2 of the drawings, there is illustrated a first preferred embodiment of the air-cushion device of the invention. In order to simplify the description of this case, explanation of the parts designated by the same numerals as in the case of FIG. 1 will be omitted, these parts having respectively same functions as those mentioned in the conventional device.

The air-cushion device, of this embodiment, generally designated by the reference numeral 28 is shown to be mounted on the base member 12 positioned at a front portion of the passenger compartment of the vehicle and comprises an improved air-cushion cover means 30 which generally includes a first cover member 32 and a second cover member 34. These members 32 and 34 are arranged to embrace the expansible air-cushion 14 in a collapsed or dormant condition, as shown.

The first cover member 32 includes a generally dome-shaped padding 36 which is fixed at its open end to the base member 12 and is formed at the upper portion thereof with a relatively large opening 38 for a reason which will be described hereinlater. A skin member 40, such as polyvinyl chloride film, adheres onto the outer surfaces of the padding 36 while covering the opening 38 of the padding 36, as shown.

The second cover member 34 is positioned adjacent the opening 38 of the padding 36 to generally cover a portion of the skin member 40 covering the opening 38. The second cover member 34 comprises a padding 42 which is covered with a skin member 44 and is fixed at its one end to the base member 12.

Within the paddings 36 and 42 of the first and second cover members 32 and 34 are disposed respective reinforcements (no numerals).

According to the present invention, cover member cutting means is further required.

In this first embodiment, the cutting means comprises a cutter 46 which is connected to the inside portion of the second cover member 34 in such a manner that a sharpened point of the cutter 46 faces the portion of the skin member 40 positioned on the opening 38 of the padding 36. Thus, when the skin member 40 on the opening 38 is moved toward the cutter 46 to touch the sharpened point of the cutter 46, it will be cut. Within a clearance defined by the skin member 40 on the opening 38 and the air-cushion 14 in a collapsed condition is located a protection plate 48 protecting the air-cushion 14 from contact with the sharpened point of the cutter 46 when the skin member 40 on the opening 38 is broken. The protection plate 48 has one end tightly disposed between the fixed end portion of the second cover member 34 and the base member 12, and the other end 50 upwardly bent. Although, in this drawing, the other end 50 is shown in contact with the skin member 40, the end 50 may be kept apart from the skin member. If desired, the cutter 46 may be fixed to the upper side of the other end 50 in such a way that the sharpened point faces the skin member 40 on the opening 38 of the padding 36. In this case, however, the other end 50 must be kept apart from the skin member 40 as a matter of course.

With the above-stated construction, the air-cushion device of the first embodiment will operate as follows.

Upon a vehicle collision, an expanding gas is momentarily generated by the gas generator 16 to expand the air-cushion 14 so that the cushion 14 pushes the protection plate 48 outwardly. With this outward movement of the protection plate 48, the skin member 40 on the opening 38 is brought into contact with the sharpened point to be cut. The cut thus appearing on the skin member 40 grows in size as the air-cushion 14 expands, and finally, the skin member 40 on the opening 38 is completely broken resulting in that the first and second cover members 32 and 34 are swung outwardly, more specifically downwardly and upwardly respectively, as shown by the arrows A and B in this drawing. Consequently, the expanding air-cushion 14 escapes or gets out from the air-cushion cover means 30 through the broken section to fully expand to achieve the normal size and safety function thereof.

Figure 3:
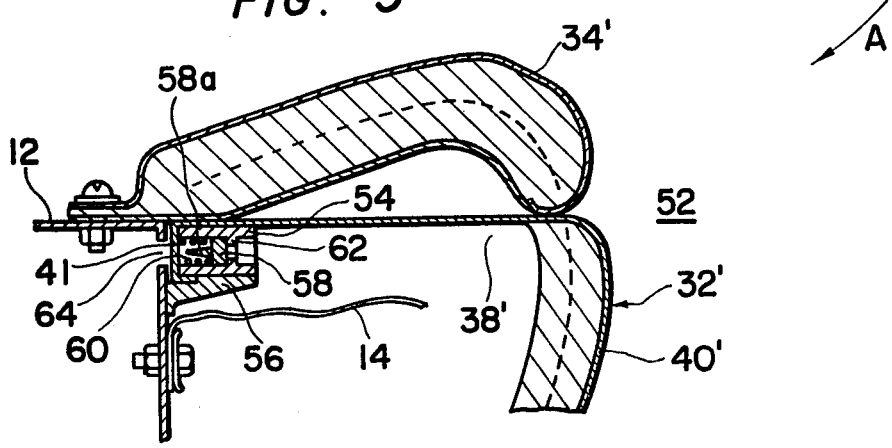
FIG. 3 is a sectional view of a second preferred embodiment of the invention.

Referring to FIG. 3, a second preferred embodiment of the air-cushion device according to the present invention is shown, in which the air-cushion device of this embodiment is generally designated by the numeral 52. The air-cushion device 52 comprises generally the same parts as in the case of the first embodiment (FIG. 2) except for the cutting means.

In this embodiment, the cutting means comprises a cylinder member 54 having one front open end covered with a leading portion 41 of the skin member 40'. As shown, the cylinder member 54 is located in a space defined between the skin member 40' on the opening 38' and the air-cushion 14 in a collapsed condition and is connected through a bracket 56 to the base member 12. It is now to be noted that the leading portion 41 is arranged perpendicularly to a longitudinal direction of the vehicle. Slidably disposed in the cylinder member 54 is a piston 58 which has a sharpened point 58a facing the leading portion 41 of the skin member 40'. For urging the piston 59 toward the rear open end of the cylinder member 54, a spring 60 is disposed in the cylinder member 54. Designated by the numeral 62 is a piston stopper. The numeral 64 indicates an opening formed in the base member 12 at a position near the leading portion 41 of the skin member 40'.

In operation, when the vehicle encounters a collision, more specifically, a head-on collision, the piston 58 is caused to move forwardly by its inertia force resulting in that the sharpened point 58a of the piston 58 cuts the leading portion 41. Therefore, the skin member 40' on the opening 38' is subjected to complete breakage, by the same reason as mentioned in the description of the first preferred embodiment, with a result that the first and second cover members 32' and 34' are swung outwardly to allow the expanding air-cushion 14 to get out from these cover members. Consequently, the normal safety function of the air-cushion 14 is achieved. It should be appreciated that the forward movement of the piston 58 is promoted by the increased pressure occuring in the space defined by the air-cushion 14 and the first cover section 32', as a result of expansion of the air-cushion 14.

Although the present invention has been shown in only two embodiments, it will be obvious to those skilled in the art that is not so limited, but is susceptible to various other changes and modifications without departing from the scope thereof.

What is claimed is:

1. An air-cushion device having an expansible air-cushion into which a gas generated by a gas generator is fed for expanding said air-cushion to protect an occupant of a vehicle during an accident, said air-cushion device comprising:
    cover means for substantially covering said air-cushion in a collapsed condition; and
    cutting means for cutting said cover means by the assistance of the expansion of said air-cushion so that said cover means is broken to allow said air-cushion to get out from said cover means to fully expand.

2. An air-cushion device as claimed in claim 1, in which said cover means comprises:
    a first cover member arranged to substantially hold therein said air-cushion in the collapsed condition and having a relatively easily breakable portion to which said cutting means is applied for cutting the same, said first cover member being swingable outwardly about said air-cushion when pushed outwardly by said air-cushion in the expanding process after the breakable portion is broken by said cutting means; and
    a second cover member arranged to substantially cover said relatively easily breakable portion of said first cover member.

3. An air-cushion device as claimed in claim 2, in which each of said first and second cover members includes a padding, a skin member adhering to said padding, and reinforcement disposed in said padding for increasing the mechanical strength of the same, the padding of said first cover member being further formed with an opening covered by the skin member of said first cover member to form said relatively easily breakable portion to which said cutting means is applied.

4. An air-cushion device as claimed in claim 3, in which said cutting means comprises a cutter which is fixed to said second cover member in such a manner that a sharpened point of said cutter is brought into contact with said skin member covering said opening when said skin member on said opening is moved toward said second cover member by the assistance of the expansion of said air-cushion.

5. An air-cushion device as claimed in claim 4, further comprising a protector which is disposed between said skin member on said opening and said air-cushion in a collapsed condition for protecting said air-cushion from being contacted with the sharpened point of said cutter even when the skin material is broken.

6. An air-cushion device as claimed in claim 3, in which said cutting means comprises a cutter which is fixed to a plate member swingably disposed between said skin member on said opening and said air-cushion in a collapsed condition, said cutter being arranged on said plate member in such a way that the sharpened point of said cutter is brought into contact with said skin member covering said opening when said plate member is moved toward the said second cover member by the assistance of the expansion of said air-cushion.

7. An air-cushion device as claimed in claim 3, in which said cutting means comprises:
a cylinder member having a first open end covered by a leading portion of said skin member, and a second open end facing the space defined by said air-cushion and said first cover member, the leading portion on said one open end being arranged perpendicularly to the longitudinal direction of said vehicle;
a piston slidable in said cylinder member and having a sharpened point facing said leading portion on said first open end of said cylinder member; and
a spring disposed in said cylinder member for biasing said piston in a direction wherein said piston is kept away from said leading portion on said first open end, whereby when the vehicle encounters a head-on colision, said piston with said sharpened point is moved by its inertia force toward said first open end of said cylinder member to cut said leading portion with the assistance of increased pressure occuring in a space defined by said air-cushion and said first cover member as a result of expansion of said air-cushion.

* * * * *